US011308211B2

(12) United States Patent
Ringlein et al.

(10) Patent No.: US 11,308,211 B2
(45) Date of Patent: Apr. 19, 2022

(54) SECURITY INCIDENT DISPOSITION PREDICTIONS BASED ON COGNITIVE EVALUATION OF SECURITY KNOWLEDGE GRAPHS

(71) Applicant: International Business Machines Corporation, Armonk, NY (US)

(72) Inventors: Burkhard Ringlein, Bülach (CH); Preeti Ravindra, Atlanta, GA (US); Bradley E. Harris, Sandy Springs, GA (US); Moazzam Khan, Marietta, GA (US); James B. Peterson, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 16/444,370

(22) Filed: Jun. 18, 2019

(65) Prior Publication Data
US 2020/0401696 A1 Dec. 24, 2020

(51) Int. Cl.
*G06F 21/56* (2013.01)
*G06N 20/00* (2019.01)
(52) U.S. Cl.
CPC ........... *G06F 21/566* (2013.01); *G06N 20/00* (2019.01); *G06F 2221/034* (2013.01)
(58) Field of Classification Search
CPC .................................................. G06F 21/566
See application file for complete search history.

(56) References Cited

U.S. PATENT DOCUMENTS

| 8,225,407 | B1 | 7/2012 | Thrower et al. |
| 10,242,201 | B1* | 3/2019 | Chen ................... G06F 21/552 |
| 10,313,379 | B1* | 6/2019 | Han ..................... G06N 20/00 |
| 2015/0172321 | A1 | 6/2015 | Kirti et al. |
| 2016/0065599 | A1 | 3/2016 | Hovor et al. |
| 2016/0330219 | A1 | 11/2016 | Hasan |
| 2018/0373578 | A1* | 12/2018 | Bridges ................ G06N 7/005 |
| 2019/0190945 | A1* | 6/2019 | Jang ................... H04L 63/1425 |
| 2019/0361951 | A1* | 11/2019 | Jayavelu ............... G06N 20/00 |
| 2020/0293946 | A1* | 9/2020 | Sachan .................. G06N 5/04 |

* cited by examiner

*Primary Examiner* — Simon P Kanaan
(74) *Attorney, Agent, or Firm* — Stephen J. Walder, Jr.; Jeffrey S. LaBaw

(57) ABSTRACT

Mechanisms are provided to perform security incident disposition operations. A security incident is received that includes a security incident data structure comprising metadata describing properties of the security incident, and a corresponding security knowledge graph which includes nodes representing elements associated with the security incident and edges representing relationships between the nodes. The security incident data structure and security knowledge graph are processed to extract a set of security incident features corresponding to the security incident and input the extracted set of security incident features into a trained security incident machine learning model. The model generates a disposition classification output based on results of processing the extracted set of security incident features. The disposition classification output is output to the source of the security incident data structure.

20 Claims, 7 Drawing Sheets

SECURITY INCIDENT DISPOSITION PREDICTIONS BASED ON COGNITIVE EVALUATION OF SECURITY KNOWLEDGE GRAPHS

BACKGROUND

The present application relates generally to an improved data processing apparatus and method and more specifically to computer mechanisms for performing security incident disposition predictions based on a cognitive evaluation of security knowledge graphs.

Computers are subject to many kinds of attacks, for example, attacks that are mounted by parties commonly known as hackers. A vandal such as a hacker may attempt to intrude upon a computer to steal information in an act of industrial espionage, or to implant a virus, or to alter records to the detriment or benefit of someone's interests or reputation. To combat such activities, computers may be monitored and protected by intrusion detection systems. An Intrusion Detection System (IDS) is a device or system that monitors a computer network and identifies potential threats.

Internet Protocol (IP) address "reputation" is an important concept in intrusion detection, and it is known that IDS software may be alerted about certain suspect IP addresses by an IP reputation service In particular, an IP reputation service hosts information associated with various IP addresses that have been identified to host suspect content including, without limitation, malware, phishing content, and/or spam. While an IP reputation service typically does not act to actually mitigate threats, but rather merely identify potential threats, the information provided by the IP reputation service provides additional capability to allow the IDS to block or warn end-users that particular IP addresses that are serving a request have been identified to host such content. The IP reputation service allows IDS software to be alerted when a suspect IP address (or URL) needs to have a "warning rating." For example, an IP address might have been the source of spam, or malware, or it may have been part of a botnet system or involved in some sort of other attack. The IP reputation service gives a warning rating to the IP address (or URL) which, in turn, warns its clients (typically IDS systems) to be careful with that IP address or URL.

A limitation of such IP reputation systems currently in practice, however, is that they are centrally managed and distributed. Usually, a vendor of the IDS software watches for suspect IP addresses and warns its IDS software clients about those reputation problems through a proprietary notification service. The use of a single central system, however, is a slow way to discover and propagate important IP reputation information. Indeed, with such centralized approaches, many client systems may be unnecessarily affected by rogue sources while waiting to be updated. For example, if a problem detected by an intrusion detection system in a network is not propagated to other IDSs in the same network immediately, there is a potential opening for an attack vector to get through to another device, perhaps using a different technique. This is particularly worrisome given the increasing incidents of Advanced Persistent Threats (APTs), where attacks to any particular network target are purposely designed to be "lightweight" and hard to detect.

One known solution to this problem is for an intrusion detection system (IDS) in the network to raise an alert to a Security Incident and Event Management (SIEM) system, which provides a central "command and control" style console. This approach, however, relies on human intervention to decide if multiple events constitute an organized attack. In most cases, these events are normally reviewed well after the fact, and it is very difficult for manual analysis to pick up a pattern, especially given that APTs raise only very low level events in IDSs.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to cause the at least one processor to implement a security incident disposition system. The security incident disposition system operates to receive, from a source computing device of a monitored computing environment, a security incident comprising a security incident data structure comprising metadata describing properties of the security incident, and a corresponding security knowledge graph. The security knowledge graph comprises nodes representing elements associated with the security incident, and edges representing relationships between the nodes. The security incident disposition system further operates to process the security incident data structure and security knowledge graph to extract, from the metadata of the security incident data structure and data corresponding to the nodes and edges of the security knowledge graph, a set of security incident features corresponding to the security incident. Moreover, the security incident disposition system operates to input the extracted set of security incident features into a trained security incident machine learning model of the security incident disposition system and generate, by the trained security incident machine learning model of the security incident disposition system, a disposition classification output based on results of processing the extracted set of security incident features by the trained security incident machine learning model. The security incident disposition system outputs the disposition classification output to the source computing device. Thus, the mechanisms of this illustrative embodiment provides guidance to a human analyst as to what the appropriate security incident disposition should be for a given security incident, based on machine learning.

In one illustrative embodiment, the security incident disposition system further operates to process the security knowledge graph to extract topology features representing an overall topology of the security knowledge graph, and inputting the extracted topology features into the trained security incident machine learning model. The trained security incident machine learning model generates the disposition classification based on results of processing the extracted set of security incident features and the extracted topology features. Thus, with this illustrative embodiment, not only the security incident specific features are utilized but the topology of the security incident as a whole, including knowledge extracted from outside sources, may be evaluated to determine an appropriate security incident disposition prediction for the security incident.

In one illustrative embodiment, the processing of the security incident data structure and securing knowledge graph to extract security incident features further comprises calculating one or more metrics based on the extracted set of security incident features, and adding the one or more metrics as additional security incident features to the set of security incident features prior to inputting the extracted set of security incident features into the trained security incident machine learning model. The calculated metrics provide more insight into the nature of the security incident that permits a more accurate prediction of the security incident disposition.

In one illustrative embodiment, the disposition classification is a prediction of a responsive action to perform in response to the security incident. In one illustrative embodiment, the disposition classification is one of a predetermined set of potential disposition classifications, each disposition classification corresponding to a different responsive action in a set of responsive actions. The set of responsive actions, in one illustrative embodiment, comprises at least one of a block responsive action that blocks access by a source of the security incident to computing resources or a redirect responsive action that redirects access by a source of the security incident to alternative computing resources. In one illustrative embodiment, the disposition classification is one of an escalate disposition classification that causes a notification of a potential threat associated with the security incident to a system administrator, or a do not escalate disposition classification which does not result in the notification. Thus, the mechanisms of these illustrative embodiments provide indications to a human analyst and/or automated system as to the responsive actions that should be performed in response to the security incident.

In one illustrative embodiment, the trained security incident machine learning model is a neural network trained on a set of training data comprising security incidents, corresponding security knowledge graphs for the security incidents in the set of training data, and corresponding correct disposition classifications for the security incidents. The trained security incident machine learning model is trained based on training features extracted from the training data and corresponding security knowledge graphs of the set of training data using a machine learning process. Thus, an artificial intelligence based mechanisms using machine learning is provided that provides a more accurate prediction of security incident dispositions that helps avoid human error.

In one illustrative embodiment, outputting the disposition classification output to the source computing device further comprises outputting a graphical user interface comprising a graphical representation of the security knowledge graph corresponding to the security incident with graphical features designating different types of elements of the security knowledge graph, the disposition classification as a recommended disposition for the security incident. In this way, a human analyst is provided with a graphical depiction of the relevant information about the security incident in such a way that the human analyst may interface with the graphical representation and investigate the security incident further to determine the appropriate security incident disposition and/or responsive action to perform.

In one illustrative embodiment, outputting the graphical user interface further comprises outputting a feedback user interface for receiving user input specifying a correctness or incorrectness of the recommended disposition. The feedback user interface further comprises one or more use interface elements for specifying a correct disposition for the security incident. In one illustrative embodiment, the security incident disposition system further operates to receive user input, via the feedback user interface, specifying the recommended disposition to be incorrect and providing a correct disposition for the security incident, generates a dynamic training data set based on the received user input, and retrains the trained security incident disposition system based on the dynamic training data set. Thus, the user, e.g., human analyst, is provided with a mechanism for overriding the predicted disposition of a security incident and in some embodiments generating additional training data to improve the training of the security incident machine learning model by providing dynamic user feedback that is collected into a dynamically generated training dataset.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
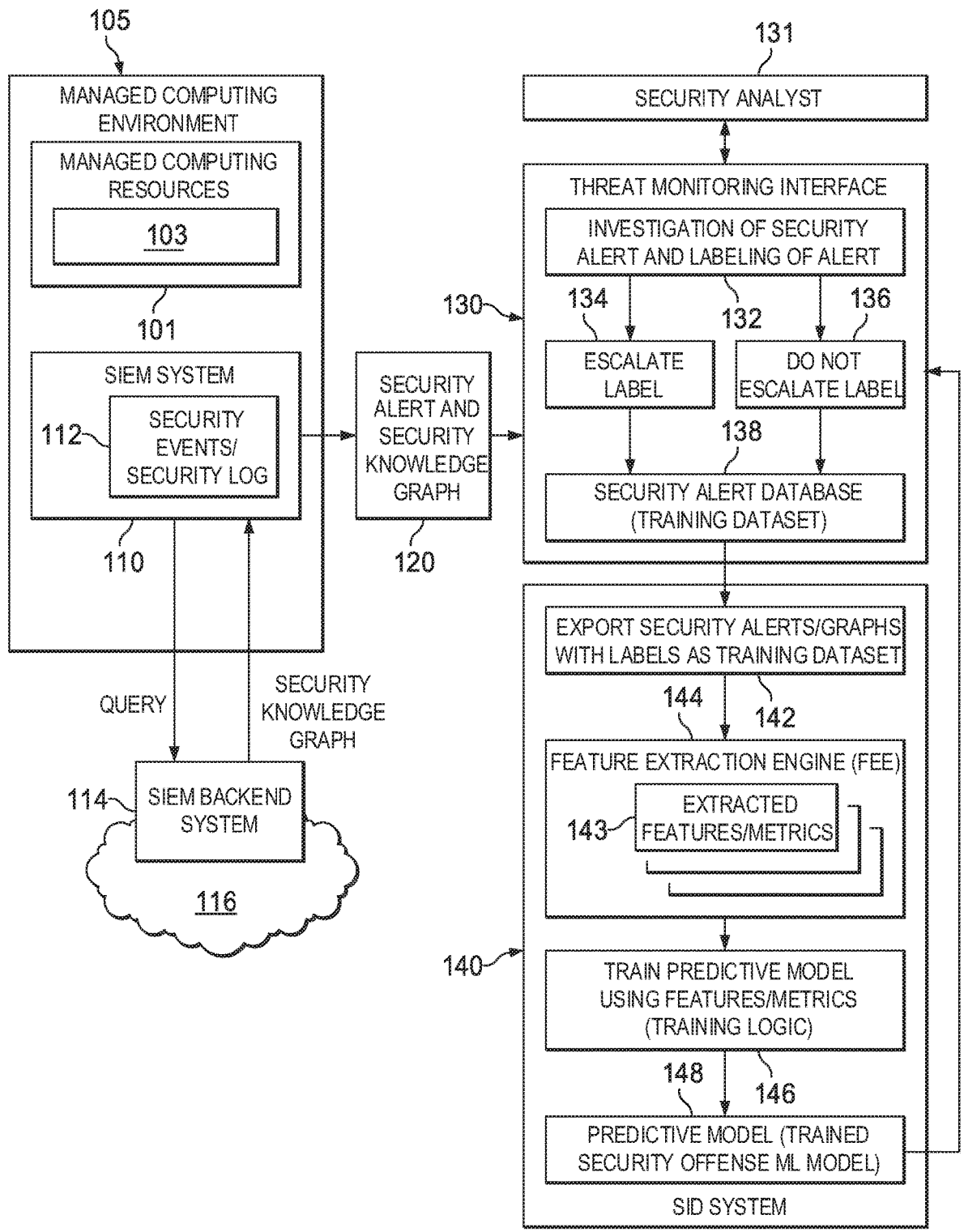
FIG. 1A is an example diagram illustrating the primary operational elements for a training phase of security incident disposition (SID) computing system, and a workflow of these primary operational elements, in accordance with one illustrative embodiment.

Security Incident and Event Management (SIEM) is an approach to security management that combines security information management with security event monitoring functions into a single security management system. A SIEM system aggregates data from various data sources in order to identify deviations in the operation of the computing devices associated with these data sources from a normal operational state, and then take appropriate responsive actions to the identified deviations. SIEM systems may utilize multiple collection agents that gather security related events from computing devices, network equipment, firewalls, intrusion prevention systems, antivirus systems, and the like. The collection agents may then send this information, or a subset of this information that has been pre-processed to identify only certain events for forwarding, to a centralized management console where security analysts examine the collected event data and prioritize events as to their security threats for appropriate responsive actions. The responsive actions may take many different forms, such as generating alert notifications, inhibiting operation of particular computer components, or the like.

IBM® QRadar® Security Intelligence Platform, available from International Business Machines (IBM) Corporation of Armonk, N.Y., is an example of one SIEM system which is designed to detect well-orchestrated, stealthy attacks as they are occurring and immediately set off alarms before any data is lost. By correlating current and historical security information, the IBM® QRadar® Security Intelligence Platform solution is able to identify indicators of advanced persistent threats (APTs) that would otherwise go unnoticed until it is too late. Events related to the same incident are automatically chained together, providing security teams with a single view into the broader threat. With QRadar®, security analysts can discover APTs earlier in the attack cycle, easily view all relevant events in one place, and quickly and accurately formulate a response plan to block advanced attackers before damage is done.

The IBM® QRadar® Security Intelligence Platform further provides a capability to facilitate various applications executing on the platform, one of which is an intelligent analyst tool referred to as IBM QRadar® Advisor with Watson™, where Watson™ refers to the IBM Watson™ cognitive computing system available from IBM Corporation of Armonk, N.Y. Among the various operations performed by QRadar® Advisor with Watson™ is the ability to generate a security knowledge graph for security incidents identified by the IBM® QRadar® Security Intelligence Platform. The security knowledge graph comprises nodes and edges, where the nodes represent various characteristics of the security incident and the edges represent relationships between the characteristics, as will be discussed in more detail hereafter.

The IBM QRadar® Advisor with Watson™ application itself has both a front end and a back end component. The front end component provides interfaces, such as a threat monitoring interface, that displays information about potential threats to computing resources of a monitored environment and provides user interface tools to allow users to initiate "investigations" or analyses and to interact with the displayed information that results from these investigations. The front end component translates security incident metadata into a search query that is sent to the backend component which may exist remotely in a cloud computing environment, for example.

The backend component, which may utilize an implementation of IBM Watson™, takes the security incident metadata provided in the search query and searches a plurality of knowledge sources for instances of the features indicated in the security incident metadata, such as Internet Protocol (IP) addresses. Universal Resource Locators (URLs), domains, file hashes, and whatever else the security incident metadata provided. The backend component may further communicate with computing components that are not a specifically indicated in the security incident metadata to gather information that may be informative as to the potential threat posed by the security incident. For example, if a file hash is found from the security incident metadata for potential malware, the backend component, via the cloud computing mechanisms, may find known IP addresses that are command and control servers for the malware matched with that file hash.

A principle functionality of the backend component which is utilized by the mechanisms of the present invention is the backend component's ability to generate a security knowledge graph based on the security incident metadata and the other security incident data gathered by the backend component. That is, the backend component creates the security knowledge graph, composed of nodes and edges, from all the various portions of data it found by processing the search query and its corresponding security incident metadata. It should be noted that the security incident metadata is mined and that information is presented in the security knowledge graph, however the security incident metadata itself is a query source. The backend component will then send back the security knowledge graph to the front end component, such as in the form of JSON objects for example. The front end component will then provide the threat monitoring user interface, including a graphical representation of the security knowledge graph and allow the user to interact with the security knowledge graph to investigate the security incident.

It should be appreciated that while the IBM® QRadar® Security Intelligence Platform and the IBM® QRadar® Advisor with Watson™ tool will be used as examples for illustrating the operation of the illustrative embodiments herein, the illustrative embodiments are not limited to such and may be implemented with any SIEM system in which a security knowledge graph and security incident metadata for a security incident are available. Moreover, while a cloud computing based embodiment may be utilized in the example embodiments described herein, where a front end component exists in a monitored computing environment SIEM system and a backend component exists in the could computing environment, along with the security incident disposition (SID) system of the example embodiments as described hereafter, the present invention is not limited to such. To the contrary, embodiments where the front end and backend components exist in the same computing device or within the same computing environment, e.g., the monitored computing environment or the cloud computing environment, may be used without departing from the spirit and scope of the present invention.

As noted above, while SIEM mechanisms provide a great tool for assisting human analysts to manually identify potential attacks based on the occurrence of different events, there is no automated mechanism for predicting the disposition of a security incident and either automatically initiating a responsive action by security mechanisms based on the prediction, or presenting the prediction to an authorized user for assisting the authorized user in decision making regarding the security incident. Even an adaptive response recommendation system, such as described in U.S. Pat. No. 8,225,407, entitled "Incident Prioritization and Adaptive Response Recommendations," issued Jul. 17, 2012, calculates a response based on prior actions and similar severity of events by determining the threat posture of an event by updating prior assessments with newly seen data. This adaptive response recommendation system does not provide an automated mechanism implementing a machine learning model on features of a security knowledge graph to automatically predict a disposition of a security incident, as in the present invention.

The illustrative embodiments provide mechanisms for implementing a machine learning based model, such as a neural network model, that is trained to recognize patterns of features extracted from the security incident itself, a security knowledge graph associated with the security incident, as well as metrics generated from analysis of the security knowledge graph, and predict a disposition of the security incident based on the recognized patterns. In extracting features from the security knowledge graph, selected features may be extracted from the nodes, edges, and overall topology of the graph in accordance with a specific configuration of the feature extraction mechanisms. The feature extraction mechanisms utilize a single traversal of the security knowledge graph associated with the security incident to collect the extracted features rather than having to perform multiple traversals.

The illustrative embodiments, given a security incident from an end user's computing environment, e.g., from a Security Incident and Event Management (SIEM) system, or one or more collection agents associated with a SIEM system, extracts features from the security incident, obtains a security knowledge graph for the security incident, extracts features from the nodes, edges, and/or topology of the security knowledge graph, and generates metrics that themselves are regarded as additional features, based on a traversal of the security knowledge graph. For example, using the IBM® QRadar® Security Intelligence Platform and the QRadar® Advisor with Watson™ computing tool as an example, the IBM® QRadar® Security Intelligence Platform may generate the security incident from an end user's monitored computing environment as well as generate, by the QRadar® Advisor with Watson™ computing tool, a security knowledge graph for the security incident. A feature extraction engine of the illustrative embodiments operates on this security incident and security knowledge graph to extract selected features from the security incident itself and the nodes, edges, and topology of the security knowledge graph, as will be discussed in greater detail hereafter. Based on the extracted features, the feature extraction engine further generates metrics, such as statistical measures, which provide further insight into the nature of the security incident. These metrics are added as additional features to the extracted set of features for use by the trained machine learning (ML) based model, referred to hereafter as the security incident ML model. Thus, the extracted features and metrics represent a pattern of features indicative of the security incident.

The features are input to the trained security incident ML model which then generates a prediction of a disposition, e.g., a responsive action to perform, based on a cognitive evaluation of the patterns of features present in the input. For example, the disposition may be to escalate or not to escalate the security incident, where an escalation of the security incident indicates that the security incident is considered to be a likely threat or attack on the computing system and an appropriate authorized user is informed of the potential threat in order to address the potential threat, such as via the sending of a notification message or communication, e.g., an instant message, an electronic mail message, a pop-up window message, etc., logging the security incident, or otherwise making the potential threat known to the authorized user via a computing device. In other embodiments, the disposition may indicate specific actions to be taken by security systems or computing systems to thwart a threat or an attack, e.g., blocking access from a particular source to specific computing resources, redirecting access attempts from a particular source to non-critical computing resource (e.g., sandboxing), or the like.

The security incident ML model, in some illustrative embodiments, is a neural network based model that is trained through a supervised or unsupervised machine learning operation. The neural network model may be a convolutional neural network (CNN), a recurrent neural network (RNN), Long Short-Term Memory (LSTM) neural network, or any other type of neural network model architecture that is currently known or later developed. Moreover, in some illustrative embodiments, other artificial intelligence based systems, rule based systems, or the like, may be utilized to operate on features extracted from a security incident and corresponding security knowledge graph to predict a disposition of the security incident. Examples of other types of artificial intelligence based systems that may be used in embodiments of the illustrative embodiments include random forests, bagged Bayesian networks, gradient boosted trees, and the like.

The security incident ML model may be trained on a set of training data comprising security incidents and their corresponding security knowledge graphs. A subject matter expert (SME) may evaluate the security incidents in the training data and provide an indication of a corresponding disposition for those security incidents, which is then stored as a ground truth for the training data. Thus, the security incidents and security knowledge graphs are provided as training data along with the ground truth of the SME's specified disposition for these security incidents to the training logic for performing machine learning based training of the security incident ML model.

During the training of the security incident ML model, the training data is provided to the feature extraction engine which extracts the selected set of features from the security incidents and their corresponding security knowledge graphs. In addition, the feature extraction engine may also generate metrics based on the extracted features and add them as additional features for input to the security incident ML model. For each security incident in the training data, the corresponding extracted features (including the generated metrics if any) are input to the security incident ML model which operates on these features to generate an output indicating a predicted disposition for the corresponding security incident. The predicted disposition may be a single disposition such as from a binary classifier type neural network, e.g., a binary output value indicating whether to escalate/not escalate, or a vector of output values indicating corresponding probabilities that a disposition associated with the output value is a correct disposition for the security incident. For example, the security incident ML model may output a vector having a plurality of vector slots, where each vector slot corresponds to a particular disposition, and a value in the corresponding vector slot represents a probability (or confidence) that the corresponding disposition is the correct disposition for the security incident.

The prediction output generated by the security incident ML model is compared, by training logic, to the ground truth of the SME specified disposition for this security incident. An error or loss is determined based on the comparison of the predicted disposition and the ground truth, and a predefined loss function. The training logic then uses a modification methodology, e.g., linear regression or the like, to modify the operational parameters of the security incident ML model, e.g., weights or the like, so as to minimize the loss generated by the loss function. Once the loss is equal to or less than a threshold value, the security incident ML model may be considered to have been trained or converged. In one illustrative embodiment, a Gradient Boost algorithm may be used on the predicted dispositions and the extracted features to modify the operational parameters during the machine learning training operation.

Once trained, the security incident ML model may be tested using a test dataset which again may comprise a set of security incidents, their corresponding security knowledge graphs, and a corresponding ground truth indication of the correct disposition for the security incident, such as may be input by a SME. The security incident ML model may be tested with the test dataset and the quality of the output generated by the trained security incident ML model may be evaluated using various metrics. If the security incident ML model is operating with acceptable quality, then the security incident ML model is ready for deployment and runtime evaluation of security incidents. If the security incident ML model is not operating with acceptable quality, then further training may be performed.

During runtime operation, a source of a security incident may be provided with a graphical user interface through which the mechanisms of the illustrative embodiments may provide a security incident disposition output for use by a human user in making decisions regarding the security incidents. For example, the security incident disposition output may output a graphical representation of the security knowledge graph with appropriate graphical features for designating different types of elements of the security knowledge graph, along with a recommended disposition of the security incident as generated by the trained security incident ML model. This recommendation may indicate a single disposition determined by the trained security incident ML model, e.g., escalate/do not escalate, or may comprise a plurality of dispositions and their corresponding probability or confidence values as determined by the trained security incident ML model. This information will provide greater insight for the human user as to the reasoning for the recommended disposition for consideration during decision making.

It should also be noted that the graphical user interface providing the security incident disposition output may further be equipped with a user feedback mechanism whereby the user may specify their agreement/non-agreement with the recommended disposition. In some embodiments, the user may further be provided with one or more user feedback fields for entering, or selecting from a listing, a correct disposition for the security incident. The user feedback information may be used to perform further training of the security incident ML model after the initial training. That is, the user feedback information may be stored along with the extracted features from the security incident, security knowledge graph, and generated metrics, as an additional dynamically generated training dataset. The user feedback may be collected over a predetermined period of time, such that periodically, the security incident ML model may be further trained using a similar machine learning training operation as discussed above, but based on the dynamically generated training dataset to improve its original training.

In some illustrative embodiments, the user may be prompted to provide user feedback when a probability or confidence value associated with the security incident disposition recommendation is below a predetermined threshold, indicating that there is not a sufficient amount of confidence that the corresponding disposition recommendation is correct. In such cases, the user may be prompted to provide a disposition, such as via the user feedback field(s), such that the user feedback provided disposition is stored along with the features from the security incident, the security knowledge graph, and metrics in the dynamically generated training dataset.

In some illustrative embodiments, responsive actions may be automatically initiated in response to the disposition output generated by the security incident ML model. For example, in cases where the confidence or probability associated with the disposition output is greater than a predetermined threshold, i.e. the security incident ML model has significant confidence that the disposition is correct for the security incident, automated processes may be initiated to perform the responsive action to protect the computing resources of the monitored environment. For example, the disposition recommendation made by the security incident ML model may be provided back to the SIEM system with an instruction to initiate SIEM system functionality for responding to the detected security threat, e.g., blocking access to computing resources by a device associated with a particular address, or the like. In some embodiments, this may be performed in a semi-automated fashion in which the disposition recommendation is provided to a user via the graphical user interface discussed above along with a user selectable graphical user interface element for initiating the responsive action.

Thus, the mechanisms of the illustrative embodiments provide a computer tool that is specifically configured to extract features from a security incident and a security knowledge graph corresponding to the security incident, and automatically generate a prediction of a disposition for the security incident. The mechanisms of the illustrative embodiments provide a feature extraction engine that extracts selected features from the security incident and the security knowledge graph associated with the security incident, as well as generates additional features corresponding to metrics generated from the extracted features. The mechanisms of the illustrative embodiments further comprise a security incident ML model that generates disposition recommendations based on the patterns of features input to the security incident ML model for a given security incident. The mechanisms of the illustrative embodiments further comprise a graphical user interface through which the security incident's security knowledge graph may be graphically depicted along with the disposition recommendation and user interface elements for providing user feedback.

It should first be appreciated that throughout this description the term "mechanism" is used to refer to elements of the present invention that perform various operations, functions, and the like A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism" Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," when used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the present description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
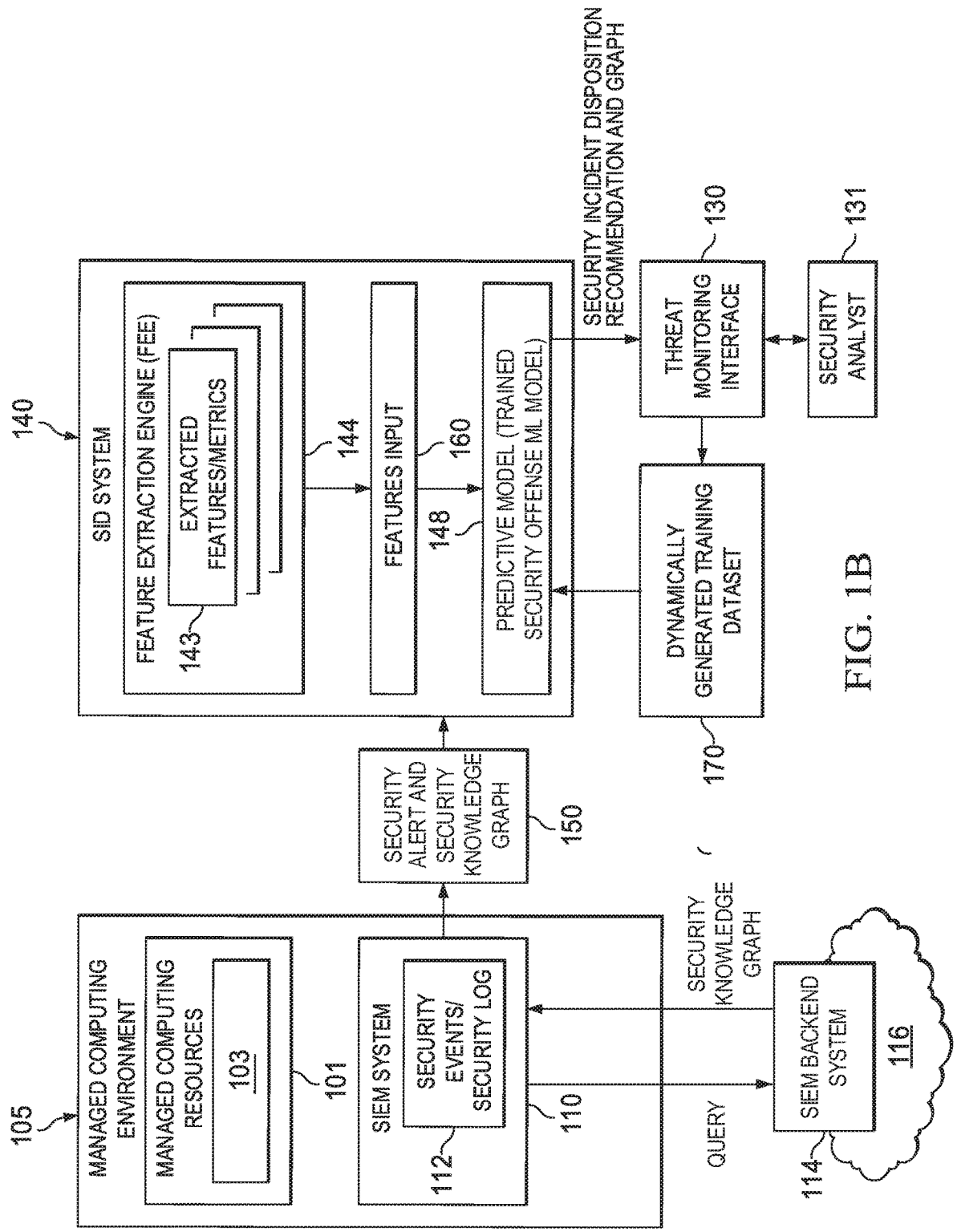
FIG. 1B is an example diagram illustrating the primary operational elements for runtime operation of a SID computing system, after training of the SID computing system, and a workflow of these primary operational elements, in accordance with one illustrative embodiment.

FIG. 1A is an example diagram illustrating the primary operational elements for a training phase of security incident disposition (SID) computing system, and a workflow of these primary operational elements, in accordance with one illustrative embodiment. FIG. 1B is an example diagram illustrating the primary operational elements for runtime operation of a SID computing system, after training of the SID computing system, and a workflow of these primary operational elements, in accordance with one illustrative embodiment. Similar reference numbers in FIGS. 1A and 1B represent similar elements and workflow operations. FIGS. 1A and 1B assume an implementation that is directed to a security incident and event management (SIEM) based embodiment in which a SIEM system provides security alerts for disposition recommendation as to whether the security alert should be escalated or not escalated (it can be appreciated that a SIEM system will not generate an alert for events that do not represent potential threats and thus, security alerts only represent either true threats (escalate) or false positives (do not escalate)). However, it should be appreciated that the illustrative embodiments are not limited to operation with SIEM systems or security alerts and may be used with any mechanism in which event notifications/logged entries need to be classified into one of a plurality of disposition classes, and which can be converted into an event graph representation and corresponding set of extracted features in accordance with the mechanisms of the illustrative embodiments.

As shown in FIG. 1A, a SIEM computing system 110, which may be positioned in an end user computing environment 105, obtains security log information from managed computing resources 101 in the end user computing environment 105, e.g., servers, client computing devices, computing network devices, firewalls, database systems, software applications executing on computing devices, and the like. Security monitoring engines 103 may be provided in association with these managed computing resources, such as agents deployed and executing on endpoint computing devices, which collect security events and provide the security event data to the SIEM computing system 110 where it is logged in a security log data structure 112. In some illustrative embodiments, the security monitoring engine(s) 103 themselves may be considered an extension of the SIEM computing system 110 and may apply SIEM rules to perform analysis of the security events to identify event data indicative of suspicious activity that may be indicative of a security attack or vulnerability, triggering a security alert 120 or security log entry to be generated. Moreover, the security monitoring engine(s) 103 may provide such security event log information to the SIEM system 110 for further evaluation. In other illustrative embodiments, the security event data gathered by the security monitoring engines 103 may be provided to the SIEM system 110 for logging in a security log 112 and for generation of security alerts 120.

Moreover, as noted above, the SIEM system 110 may further comprise logic for generating a security knowledge graph for the security alert. In one illustrative embodiment, as shown in FIG. 1A, the SIEM system 110 may include both a front end component 110 and a backend component 114, with the backend component 114 in the depicted example embodiment being provided in a cloud computing environment 116. As described above, in one illustrative embodiment, the SIEM system frontend component 110 may generate search queries based on received security incident metadata which is sent to the SIEM backend system or component 114 which processes the search query and security incident metadata, potentially querying other knowledge sources and computing devices for data related to the security incident metadata, and generates a security knowledge graph for the security incident which is returned to the frontend SIEM system component 110 which provides a graphical representation of the security knowledge graph via the threat monitoring interface 130. As noted above, it should be appreciated that, in some illustrative embodiments, the frontend component a 110 and backend component 114 may be integrated together into a single SIEM system implementation in a single computing environment, e.g., within the monitored or managed computing environment or in the cloud computing environment.

Figure 2:
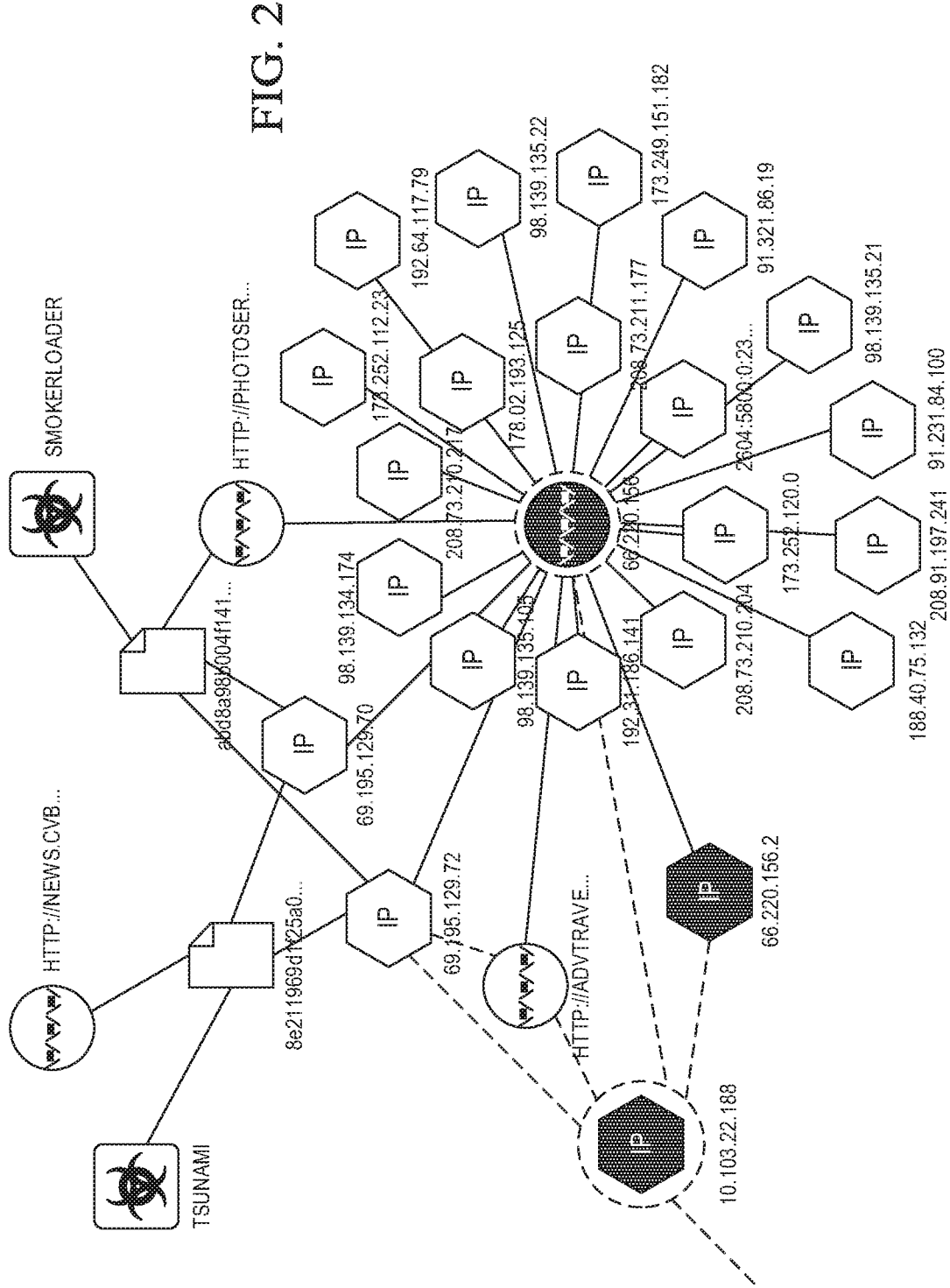
FIG. 2 is an example diagram of a security knowledge graph for an example security incident or alert in accordance with one illustrative embodiment.

For example, in one illustrative embodiment, the SIEM system 110 may be the IBM® QRadar® Security Intelligence Platform and the QRadar® Advisor with Watson™ computing tool where the IBM® QRadar® Security Intelligence Platform may generate the security alert representing a security incident from an end user's monitored computing environment 105 as well as generate, by the QRadar® Advisor with Watson™ computing tool operating in a backend system or component 114, the security knowledge graph for the security incident and provide the security alert and security knowledge graph 120 to the threat monitoring interface 130 for evaluation by a security analyst (authorized user). An example of a security knowledge graph which may be generated by the SIEM system 110 is shown in FIG. 2 and will be described in more detail hereafter.

The security event data stored in the security log 112 may specify various events associated with the particular managed computing resources 101 that represent events of interest to security evaluations, e.g., failed login attempts, password changes, network traffic patterns, system configuration changes, etc. SIEM rules are applied by the security monitoring engine(s) 103 (e.g., agents) and/or SIEM computing system 110, e.g., IBM® QRadar® Security Intelligence Platform, to the security log 112 information to identify potential threats to computing resources and generate corresponding security alerts and security knowledge graphs 120. The security alerts/graphs 120 may be logged in one or more security alert log entries or may be immediately output to a threat monitoring interface 130 as they occur.

The threat monitoring interface 130 is a user interface that may be utilized by a security analyst to view security alerts/graphs 120 and determine the veracity of the security alerts 120, i.e. determine whether the security alerts 120 represent an actual security threat, for which a responsive action is to be performed (e.g., escalate 134), or a false-positive generated by the SIEM rules applied by the SIEM computing system 110, for which no responsive action is necessary (e.g., do not escalate 136). The threat monitoring interface 130 receives security alerts/graphs 120 and displays the security alert attributes and provides a graphical display of the security knowledge graph to a security analyst 131 via a graphical user interface so that that security analyst 131 is able to manually view the security alert attributes and graph, investigate the basis of the security alert 132, and then label the security alert 120 as to the proper disposition for the security alert 132, e.g., an actual threat which should be escalated 134 or a false positive alert that should not be escalated 136. The labeled security alert data including the security alert, the security knowledge graph, and the security analyst's provided disposition label are then stored in an entry in the security alert database 138 to thereby generate a training dataset comprising security alert entries and corresponding disposition labels as to the correct disposition classification of the security alert.

The training dataset, comprising the security alerts, the security knowledge graphs, and their corresponding correct disposition classifications, are exported 142 into a feature extraction engine (FEE) 144 of the SID system 140. The FEE 144 extracts security alert attributes, or features, from the security alert entries in the training dataset exported from the security alert database 138, i.e. for each security alert stored in the training dataset 138, the FEE 144 extracts features from the security alert and its corresponding security knowledge graph. As mentioned previously, this extraction of features may include extracting features from the nodes and edges of the security knowledge graph as well as the overall topology of the security knowledge graph. In addition, features may be extracted from the metadata of the security incident or security alert itself. The FEE 144 is configured to extract selected features from the security alert (or incident) metadata. The FEE 144 is also configured to extract selected features from the nodes (e.g., toxicity feature, magnitude feature, etc.), edges (e.g., edge type feature), and topology (e.g., node of type A is connected to node of type B via edge of type C) of the security knowledge graph.

To better understand the extraction of features from the security knowledge graph, FIG. 2 is an example diagram of a security knowledge graph for an example security incident or alert in accordance with one illustrative embodiment. The example diagram shown in FIG. 2 is a security knowledge graph generated by the QRadar® Advisor with Watson™ computing tool, as one example of a computing tool that may be used to generate a security knowledge graph in the illustrative embodiments.

As shown in FIG. 2, the security knowledge graph consists of the security offense source IP as a root node of the security knowledge graph. Network observables, such as an Internet Protocol (IP) address, Universal Resource Locator (URL), domain name, file hashes, and the like, are represented as nodes connected to the root node via different network events such as, but not limited to, "connected", "uses", "related", etc. as edges. "Network observable" is a property of a communication event that can be observed by a network interface of a computing device. Such "network observables" are observed by data sources that the security incident disposition mechanisms of the illustrative embodiments use as sources of security incident information, such as IBM X-Force Exchange, Watson™ for CyberSecurity corpus, and the like.

For those network observables that are external to the monitored environment of the enterprise, threat intelligence information is connected to the external network observables in the form of nodes and edges. The threat intelligence, in a general sense is any knowledge that allows one to prevent or mitigate cyberattacks, and more specifically is evidence-based knowledge, including context, mechanisms, indicators, implications of an existing or emerging menace or hazard to assets, and the like. This threat intelligence can be used as a context to inform decisions regarding the subject's response to that menace or hazard. The threat intelligence may be provided by external sources, such as threat intelligence services such as IBM X-Force, CrowdStrike, and the like, that have threat hunters constantly monitoring the threat landscape and creating information on what are the indicators associated with existing threats/emerging threats. For example, it may be known to threat intelligence services that the IP address 64.22.22.22 is an IP address that is known to be associated with a webpage that services exploit kits. Here 64.22.22.22 is an indicator, so if one sees an offense containing this IP address, using threat intelligence information, one can determine that an exploit kit could have exploited one of the organization's computers.

Threat intelligence information enriching the external network observables include, but is not limited to, category, reputation, risk, toxicity, and other types of properties of the external network observables coming from unstructured sources such as security blogs and structured sources, such as IBM X-Force and CrowdStrike, IBM Watson™ for Cybersecurity, or other sources of threat intelligence, such as the U.S. Department of Homeland Security's watchlist. Threat intelligence also adds more information to the security knowledge graph about these external network observables by extracting the interaction of these observables with other external network artifacts from a security knowledge corpus consisting of the unstructured sources.

With reference now to the particular depiction in FIG. 2, the root node is shown in FIG. 2 as a black colored node with a halo in the center of the graph. The network observable associated with the root node was found in the security alert metadata of the security incident detected in the monitored environment and represents the source IP address of the security incident. The source IP address connected to an external IP address that resolved to a domain name (the domain name being an external network observable) indicated by the other black nodes connected by edges to the root node. Threat intelligence found a host of malicious IP addresses that resolved to this external network observable, with these threat intelligence artifacts being added as nodes to the security knowledge graph along with a toxicity value that makes the nodes rendered in a different color, e.g., red hexes for the malicious IP addresses, red circles for the malicious domains, etc. The interactions between these added threat intelligence artifacts with other network artifacts, such as the file leading to the node "smokeloader" in FIG. 2, are obtained from the security knowledge corpus and added to the security knowledge graph.

In one illustrative embodiment, when generating this security knowledge graph, the security knowledge graph is constructed such that each network observable identified by the SIEM system that is to be queried, i.e. each network observable representative of a security incident, becomes a root node of its own security knowledge graph. The signal/relevance of the root node is bootstrapped with a value of 1.0 unless the value is otherwise explicitly stated. The terms "signal" or "relevance" represent the level of a possible association that a network observable may have with data found in structured and unstructured sources and the local environment (note that "signal" value and "relevance" value are specific to IBM QRadar® Advisor with Watson™ and are only provided herein as examples). The signal value is dissipated to the new nodes along the new edges indicating the level of association a node may have with the original queried network observable. Signal dissipation via an edge depends on "conductance" and "temporal" value of the edge. For example, if a domain name resolves to an IP address, then the conductance value is high because resolution is an accurate association and "resolve" is the edge type between the external observable and the resolved IP address. For temporal decay, an example may be an old resolution of a domain name resulting in higher signal decay compared to a newer resolution. The construction of the security knowledge graph is a known mechanism, such as provided in the QRadar® Advisor with Watson™ computing tool.

When extracting features from the security knowledge graph, the security knowledge graph is traversed from the root node and selected features of the encountered nodes, edges, and the overall topology are extracted and stored as part of a feature set representative of the security incident. For example, node features such as "toxicity", "reputation" (if the threat source provides reputation data), and "node type", may be extracted. Further examples of features that may be extracted from the nodes and/or security incident include category.label, (the label provided by such sources as IBM X-Force Exchange which denotes the category of this node, such as botnet, spam, etc.), emailBody (a binary feature determining whether this node represents an email), filetype (such as exe, doc, pdf), has_executed_file (feature from the offense metadata which says whether, for example, a piece of malware ran or not), Reputation.label, Reputation.score, (a score from, for example, IBM X-Force Exchange, which denotes just how bad a particular item, such as an IP address or domain, is with regard to its level of threat), Signal, Reputation.toxicity (a value from 0 to 1 indicating the degree that something seems to be malicious), Category.toxicity, (similar to reputation.toxicity, but instead rates categories such as malware, spam, botnet, etc. This is a value indicating the "danger" of this category), and Hashes.toxicity (similar to the other toxicities, but this rates file hashes from such sources as IBM X-Force Exchange or the unstructured Watson for Cybersecurity corpus). Examples of node types may be a "domain" node, "hash" node, "IP" node, etc.

For edge features, an example of an edge feature that may be extracted include the edge type, e.g., "contains", "connects", and "resolves". With regard to topology features, examples of topology features that may be extracted from the security knowledge graph include number of nodes which have at least X incoming edges, number of nodes that have at least X outgoing edges, tuples (such as a triplet tuple (node-edge-node)) indicating combinations that are toxic that indicate potential malicious connections, etc. where X is any suitable value. While traversing the topology of the security knowledge graph, various counts may be maintained for some of the extracted features to assist in generating metric features. For example, counts of each type of node, counts of each type of edge, counts of toxic nodes, counts of numbers of nodes having particular reputations, e.g., malware, etc.

These features are added to features extracted from the metadata associated with the security incident or alert itself. For the security incident or alert itself, the metadata associated with the security incident or alert may be analyzed to extract features such as "magnitude", "severity", and "credibility" from the metadata. In one illustrative embodiment, the features extracted from the security incident/alert and the security knowledge graph are features that may be encoded in a numeric, binary, or normal fashion. In one illustrative embodiment, approximately 100 different types of graph based and security incident based features are extracted along with approximately 145 category features from security incident categories, i.e. the type of security incidences that are being looked for, e.g., failed login attempt, SMB brute force, virus triggered, etc. The security incident categories are used to generate one-hot encoded features that are included in the extracted feature set for the security incident/alert.

The extraction of the features is performed by traversing the security knowledge graph where each feature extraction is performed by a feature extraction function that has the current internal state of the feature extraction, which is saved between each extraction function's operation, the current node, and all edges of this node as input, and returns the new internal state of this feature. All features of a security knowledge graph can be assembled step-by-step with this available data in each iteration. After the graph is traversed via a single traversal, all feature extraction functions are called once more to assemble the combined feature output based on the latest internal state. This allows for a fast and parallelizable feature extraction of the security knowledge graph and consequently increases the performance of the SID computing system.

The features extracted from the security incident/alert and the security knowledge graph may be used as a basis for the feature extraction engine (FEE) 144 to generate metric features that are added to the extracted feature set for the security incident/alert. These metrics provide a statistical measure of aspects of the security incident that provide insights into the nature of the security incident. For example, metric features that may be include a mean magnitude, a mean toxicity, a sum of toxicity of nodes indicated by sources that assign reputation and toxicity values, a sum of toxicity of nodes indicated by sources which have a category toxicity (categories can have toxicity levels associated with them as well. For example, "malware" will have a higher toxicity than "spam"), sum of toxicity of hashes (hashes of files discovered in the security incident metadata, as well as any hashes found during the creation of the knowledge graphs, are hashes of specific files such as malware or virus samples), number of nodes that have malware in their reputation or category, ratio of non-local (external to the monitored environment) nodes to local (internal to the monitored environment) nodes, and count of each node type.

Some additional metric features that may be generated include the following listing of metrics and their associated extracted features from the nodes of the security knowledge graph:

category.label—a count of the nodes that are categorized as malware, scanning, botnet, spam, anonymization, phishing, or other categories;

emailBody—Boolean value that is a logical OR of all nodes that have this feature;

filetype—count of the number of "exe", "text", "pdf", "msword", or other file types;

has_executed_file—Boolean value that is a logical OR of all nodes that have this feature;

Reputation.label—count of number of malware, scanning, botnet, spam, anonymization, phishing, or other reputation categories;

Reputation.score—scaling of the scores (Reputation score is computed by the threat intelligence service to indicate whether an indicator or network observable is benign or malicious, with the scores being indicator of danger, how recent that node was dangerous, etc. Since these scores may be provided by various sources using different representations, e.g., floating point value from zero to one, or integer from zero to 100, the scores are scaled so that they are all within a same range).

Reputation.toxicity—a median of the reputation toxicity values;

Category.toxicity—a median of the category toxicity values;

Hashes.toxicity—a median of the hash toxicity values;

Signal—median value (Each node has a signal value from which a median of the signal values for all the nodes is generated.)

Metric features that may be generated based on the features extracted from the edges, in accordance with one illustrative embodiment, may be a count of each edge type. The metric features may also include a count of a number of QRadar® Advisor with Watson™ (QRA) relevant triples, i.e. node→edge→node combinations as defined above that indicate potential malicious connections. So, domain→resolves→IP, or ['File', 'CONNECT', 'Url'], ['EmailContent', 'ATTACHMENT', 'File'], ['File', 'CONNECT', 'IpAddress'], ['File', 'CONNECT', 'DomainName'], for example. For example, if a File connects to a URL, it could be an example of a malware communicating with a command and control server. This is denoted by the triple ['File', 'CONNECT', 'Url'] where node 1 is of type File, node 2 is of type 'URL' and they are connected by an edge of type 'CONNECT'. The metric features may also include a median of all "UKG" edges, i.e. edges that come from unstructured threat intelligence information. Edges may be counted based on the source contributing an edge. If the source of an edge says the relationship came from unstructured threat intelligence sources, the edge may be counted as a "UKG" edge (unstructured knowledge graph). The median on the scores of these edges is computed where the scores signify how confident the natural language parsing model is in the edge connecting two nodes.

The above examples of metric features that may be added to the extracted features from the security incident/alert and the security knowledge graph are only examples and other metric features, as well as other extracted features, may be used in various embodiments of the present invention without departing from the spirit and scope of the present invention.

Returning again to FIG. 1A, the extracted features/metrics 143 are input to a cognitive predictive computer model 148 which is then trained 146 based on the extracted features/metrics 143 and the corresponding correct labels provided by the security analyst 131 and associated with the corresponding security alert entry exported 142 to the FEE 144. The cognitive predictive computer model 148 may be security incident machine learning (ML) mechanism, such as previously described above, which may employ a neural network model, such as a convolutional neural network (CNN) model, that is trained through a machine learning process using, as input, the extracted features/metrics from the exported security alerts/security knowledge graphs and the corresponding ground truth of the correct disposition generated by the security analyst 131 and stored in the security alert database 138. It should be appreciated that a neural network based mechanism is provided herein as only an example and any other computing tool that facilitates the performance of the operations of the illustrative embodiments with regard to predicting a threat disposition of a security incident may be used without departing from the spirit and scope of the present invention.

This machine learning may be a supervised or unsupervised machine learning operation, such as by executing the CNN model on the extracted features/metrics for security alerts to thereby generate a disposition classification of the security incident/alert as to whether it represents a true threat requiring escalation or a false positive that should not be escalated, and then comparing the result generated by the CNN model to the correct disposition classification for the security alert as specified by the security analyst 131. Based on a loss function associated with the CNN model, a loss, or error, is calculated and operational parameters of nodes or neurons of the CNN model are modified in an attempt to reduce the loss or error calculated by the loss function. This process may be repeated iteratively with the same or different extracted features/metrics for the same or different security incidents/alerts and security alert correct disposition classifications. Once the loss or error is equal to or less than a predetermined threshold loss or error, the training of the CNN model is determined to have converged and the training process may be discontinued. The trained CNN model, i.e. the trained security incident ML model 148 may then be deployed for runtime execution on new security incidents/alerts to classify their corresponding extracted feature/metric patterns as to whether they represent true threats requiring escalation or are false positives that do not require escalation.

It should be appreciated that the example described above with regard to FIG. 1A, and hereafter with regard to FIG. 1B, uses a binary disposition classification of either escalate or do not escalate, however the illustrative embodiments are not limited to such. As noted previously, in other illustrative embodiments, the security incident ML model may be trained to predict a variety of different dispositions in addition to, or in replacement of, the dispositions of escalate/do not escalate. For example, in some illustrative embodiments, the dispositions may correspond to recommended responsive actions to be performed. These responsive actions may be automatically, or semi-automatically initiated by computing systems so as to respond to perceived threats to computing resources of a monitored/managed computing environment 105.

FIG. 1B illustrates an operation of the trained security incident ML mechanism 148 during runtime operation on new security incidents/alerts and their corresponding security knowledge graphs 150. It should be noted that in the runtime operation shown in FIG. 1B, the threat monitoring interface 130 is used to present security incident/alert information, disposition recommendations, the security knowledge graph, and provide a user feedback mechanism through which a security analyst 131 may provide user feedback indicating the correctness/incorrectness of the recommended disposition and/or a correct disposition for the security incident/alert 150. Since the initial training has been completed prior to the runtime operation of FIG. 1B, the new security incidents/alerts and their corresponding security knowledge graphs 150 may be input directly into the SID computing system 140. That is, similar to the operation of the SIEM system 110 during the training operation, the SIEM system 110 generates new security incidents/alerts, which are the basis for the generation of security knowledge graphs 150 which, during runtime operation, are sent directly to the SID computing system 140 for feature extraction and metric generation 143 by the FEE 144.

The trained predictive model 148 operates on the features input 160 comprising the extracted features from the security incident/alert and the security knowledge graph, as well as generated metrics based on these extracted features, to apply the trained feature analysis operations, e.g., the activation functions, of the nodes/neurons of the predictive model, e.g., the CNN, to the features input 160 and generate a disposition classification for the security incident/alert, e.g., whether to escalate or not escalate the security incident/alert. The output disposition classification generated by the predictive model 148 may be provided to a security analyst 131, such as via the threat monitoring interface 130 in FIG. 1A, for further evaluation, logged in the security alert database 138, or otherwise made available for further use in determining a responsive action to take if deemed necessary.

As discussed previously, the threat monitoring interface 130, in addition to presenting the recommended disposition of the security incident/alert and the security knowledge graph for consideration by the security analyst 131, may provide a user interface through which the security analyst 131 may provide user feedback indicating the correctness of the recommended disposition and/or a correct disposition. If the security analyst 131 indicates that the recommended disposition is incorrect, this information and the correct disposition, if the security analyst 131 provides one, are stored in a dynamically generated training dataset 170 along with the extracted feature input 160 for the security incident/alert. The dynamically generated training dataset 170 may compile such user feedback over multipole security incidents/alerts over a predetermined period of time or until a predetermined number of such user feedback instances are recorded in the dynamically generated training dataset 170 At such time, a training update may be initiated with regard to the trained security incident ML model 148 so that the training of the trained security incident ML model 148 is repeated with a baseline training of the already trained security incident ML model 148 but whose operational parameters are further trained using the dynamically generated training dataset 170 using a training operation as described previously with regard to FIG. 1A. Alternatively, a complete training of a non-trained security incident ML model may be initiated using the training dataset 138 in FIG. 1A augmented with the dynamically generated training dataset 170, and the trained security incident ML model 148 may then be replaced with this newly trained security incident ML model.

It should be appreciated that there are many modifications that may be made to the example illustrative embodiments shown in FIGS. 1A and 1B without departing from the spirit and scope of the illustrative embodiments. For example, while FIGS. 1A and 1B illustrate the feature extraction engine (FEE) 144 as being part of the SID computing system 140 in a separate computing environment from the end user's managed/monitored computing environment 105, the illustrative embodiments are not limited to such. Rather, in some illustrative embodiments, the FEE 144 may be deployed in the end user's managed/monitored computing environment 105 and may operate on security incidents/alerts 120, 150 generated by the SIEM system 110, within the end user computing environment 105. In such embodiments, rather than exporting the security incidents/alerts and their security knowledge graphs 120, 150 to the threat monitoring interface 130 or SID computing system 140, instead the extracted features/metrics may be exported. During training, the security analyst 131 may view the security incidents/alerts and security knowledge graphs 120, 150 using a user interface that is accessible within the end user computing environment 105 and may provide the security analyst provided disposition labels as to whether the security incidents/alerts represent true threats (escalate) or false positives (do not escalate). The outputting of such security incidents/alerts, security knowledge graphs, and corresponding correct labels may be performed as a training dataset that is exported directly to the SID system 140 for processing by the predictive model 148.

In addition, as another modification example, rather than training the predictive model 148 on both true threat (escalate) and false positive (do not escalate) security incident/alert and corresponding security knowledge graph features, the predictive model 148 may be trained using an unsupervised training operation on only false positive (do not escalate) security incidents/alerts so that the predictive model 148 learns how to recognize extracted features/metrics patterns that corresponding to false positives (do not escalate). In this way, the predictive model 148 regards false positives (do not escalate) as a "normal" output and any anomalous inputs, i.e. security incidents/alerts that are not false positives, as true threats. Hence a single node output layer may be provided that indicates 1 (normal—false positive—do not escalate) or 0 (abnormal—true threat—escalate), for example. Of course, in another illustrative embodiment, an opposite approach to training may be taken in which only the true positives (escalate) are treated as "normal" output and any anomalous inputs are treated as not a threat.

Other modifications may also be made to the mechanisms and training/runtime operation of the SID system 140 without departing from the spirit and scope of the illustrative embodiments. For example, various activation functions, loss functions, and the like may be employed depending on the desired implementation.

While the above illustrative embodiments are described in terms of security incidents/alerts and security knowledge graphs generated by a SIEM system, the illustrative embodiments are not limited to such security incidents/alerts or security knowledge graphs and instead may be applied to any structured notification or log entry in which attributes of the underlying events occurring within the monitored computing environment are recorded for further processing. The illustrative embodiments encode the attributes extracted features which can then be processed by the trained ML model in a cognitive computing manner to evaluate whether or not the attributes represent a particular disposition class for the event, e.g., a true threat or a false-positive in the case of a SIEM computing system implementation Whether these attributes are provided as security alert notifications, log entries in a log data structure, or any other data structure or notification message, the mechanisms of the illustrative embodiments are applicable to such data structures.

It should be appreciated that references to the "SIEM system" herein refers to the SIEM system as a whole, e.g., both the front end and backend components if the embodiment utilizes a front end and backend component. Thus, when the present description refers to the SIEM system generating the security knowledge graph, the actual generation of the security knowledge graph may be performed by a backend component of the SIEM system and provided to the front end component for representation in a threat monitoring interface. However, in other embodiments, such as ones in which the front end component and backend component are integrated with each other, the same component may perform the initial analysis of the security incident as well as generate the security knowledge graph. As there may be different implementations based on the particular suitability for the deployment of the computing tool of the illustrative embodiments, the present description will reference the "SIEM system" as a whole, without limiting the present invention to any one of these possible implementations, all of which are within the spirit and scope of the present invention.

Also, while the illustrative embodiments are described in the context of a SIEM system and security incidents/alerts concerning potential security threats to computing resources, the illustrative embodiments are not limited to such and any computing resource monitoring mechanism that generates alerts and/or log entries for events occurring within a computing environment may make use of the mechanisms of the illustrative embodiments. That is, the illustrative embodiments take the alerts generated by a monitoring computing system, generates a knowledge graph representation of the alerts, and extracts features from the alerts and the knowledge graph which can then be classified using cognitive computing models into one of a plurality of disposition classifications. Thus, the mechanisms of the illustrative embodiments are applicable to a plethora of implementations involving alerts/log entries that may be represented as knowledge graphs from which features may be extracted in the manner described above.

Figure 3A:
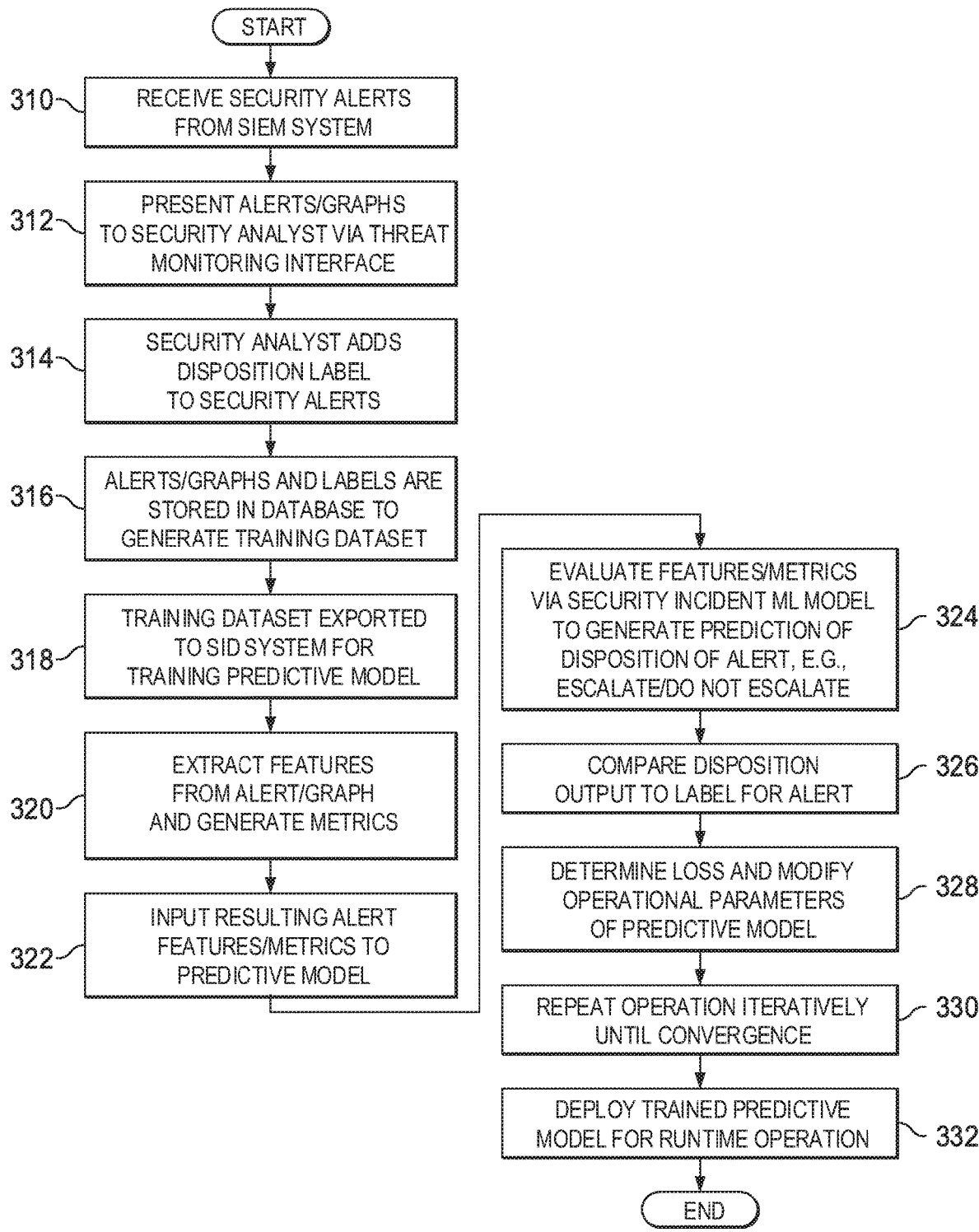
FIG. 3A is a flowchart outlining an example operation of a SID system during training of a security incident machine learning model in accordance with one illustrative embodiment.
Figure 3B:
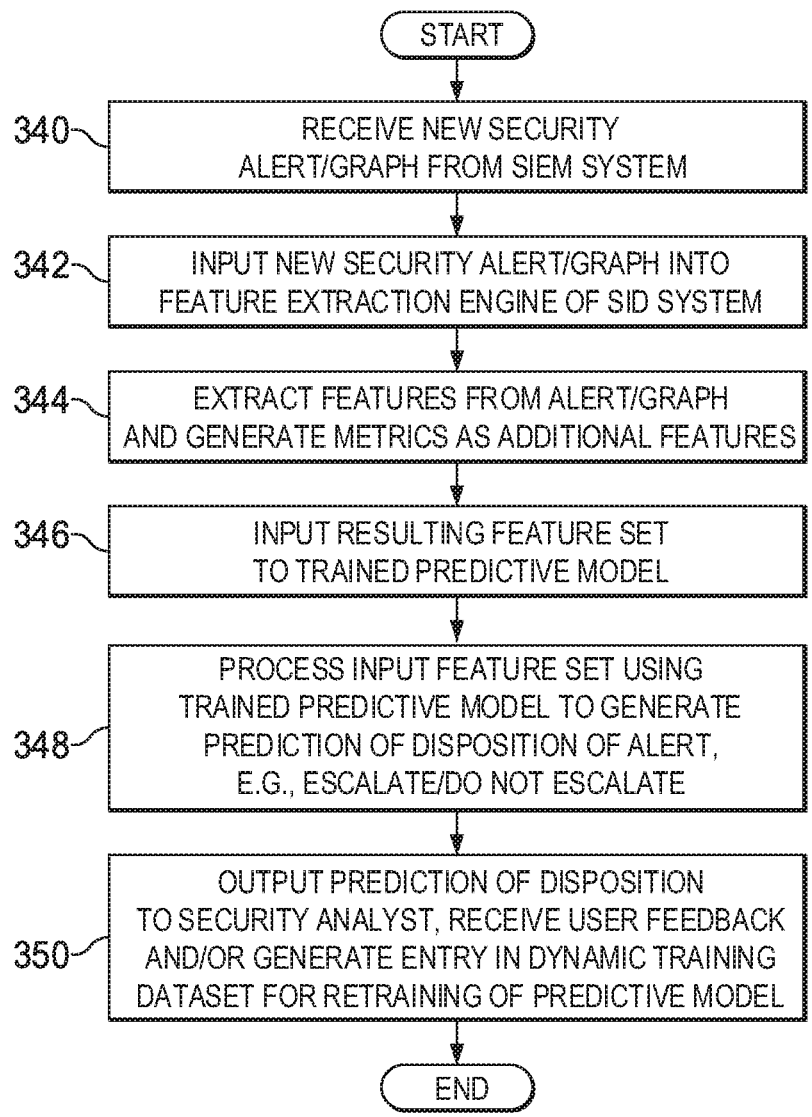
FIG. 3B is a flowchart outlining an example operation of a SID system during runtime operation of a security incident machine learning model in accordance with one illustrative embodiment.

FIGS. 3A and 3B illustrate flowcharts outlining an example operation of a SID system during training (FIG. 3A) and runtime operation (FIG. 3B), in accordance with one illustrative embodiment. As shown in FIG. 3A, the training operation for training the SID system starts by receiving a plurality of security incidents/alerts generated by a STEM system monitoring security events occurring with regard to one or more computing resources of a monitored computing environment (step 310). The security incidents/alerts are used as a basis for generating security knowledge graphs for the security incidents/alerts which are then submitted to a threat monitoring interface for presentation to a security analyst (step 312). The security analyst adds a disposition classification label to the security incident/alert indicating whether or not the security incident/alert is associated with a true threat (escalate) to security of computing resources in the monitored computing environment, or is a false positive (do not escalate) generated by the SEM system (step 314). The security incident/alert and its corresponding disposition label are stored in a security incident/alert database for use as part of a training dataset (step 316).

The training dataset is exported to the SID computing system for training a predictive computing model of the SID system (step 318). Each security incident/alert and its corresponding security knowledge graph in the training dataset is processed by the feature extraction engine (FEE) to extract features and generate metrics representative of the nature of the security incident/alert (step 320). The extracted features and generated metrics are input to the predictive model, e.g., a neural network model (step 322). The neural network model processes the extracted features and metrics of the security alerts and evaluate them to generate a prediction of a disposition classification of the security incident/alert with regard to whether or not it represents a true threat (escalate) or a false positive (do not escalate) (step 324). In addition, the correct disposition label for the corresponding security alert is provided to training logic associated with the neural network model so as to compare (step 326) the correct disposition label for the security incident/alert to the output generated by the neural network model to determine a loss or error in the operation of the neural network model (step 328).

Based on the determined loss or error, the training logic adjusts operational parameters of the neural network model to reduce the loss or error in the neural network model output (step 330). This operation is repeated in an iterative manner until the loss or error is equal to or less than a predetermined value at which time the trained predictive model is deployed for runtime processing of new security alerts (step 332). The operation then terminates.

With reference now to FIG. 3B, during runtime operation, a new security incident/alert is generated by the SIEM system which also generates a corresponding security knowledge graph for the security incident/alert (step 340). The security incident/alert and its security knowledge graph are input to the feature extraction engine (FEE) of the SID computing system (step 342). The FEE extracts features from the security incident/alert and security knowledge graph and generates metrics which together represent a feature input to the trained predictive model, i.e. the trained security incident ML model (step 344). The resulting feature set is input to the trained predictive model (step 346) which processes the feature set and evaluates the feature patterns to generate a prediction of a disposition classification for the security incident/alert as to whether or not it represents a true threat (escalate) or a false positive (do not escalate) (step 348). The prediction output is then provided to a security analyst, logged in a security alert database, and/or otherwise made available for further processing or evaluation by security analysts to handle security alerts that represent true security threats and avoid wasted resource expenditures on security alerts that are likely false positives (step 350). In addition, user feedback and/or entries in a dynamic training dataset may be generated based on the user feedback. The operation then terminates.

It should be noted that while the illustrative embodiments described above include the ability to obtain user feedback via the user interface as to the correctness/incorrectness of a predicted disposition of a security incident, user feedback may not always be solicited from the user. For example, in some illustrative embodiments, user feedback may only be solicited from the user in response to the predicted disposition having a rating, e.g., confidence value, probability value, etc., that is below a predetermined threshold value. That is, if the highest rated predicted disposition still has a confidence or probability value that is less than this threshold value, then the user interface that is presented to the user may include the fields for obtaining user feedback information as to the correctness/incorrectness of the predicted disposition. Otherwise, the predicted disposition may be provided to the user in a user interface where no user feedback fields are presented, or only presented upon request by the user via a user interface element.

Figure 4:
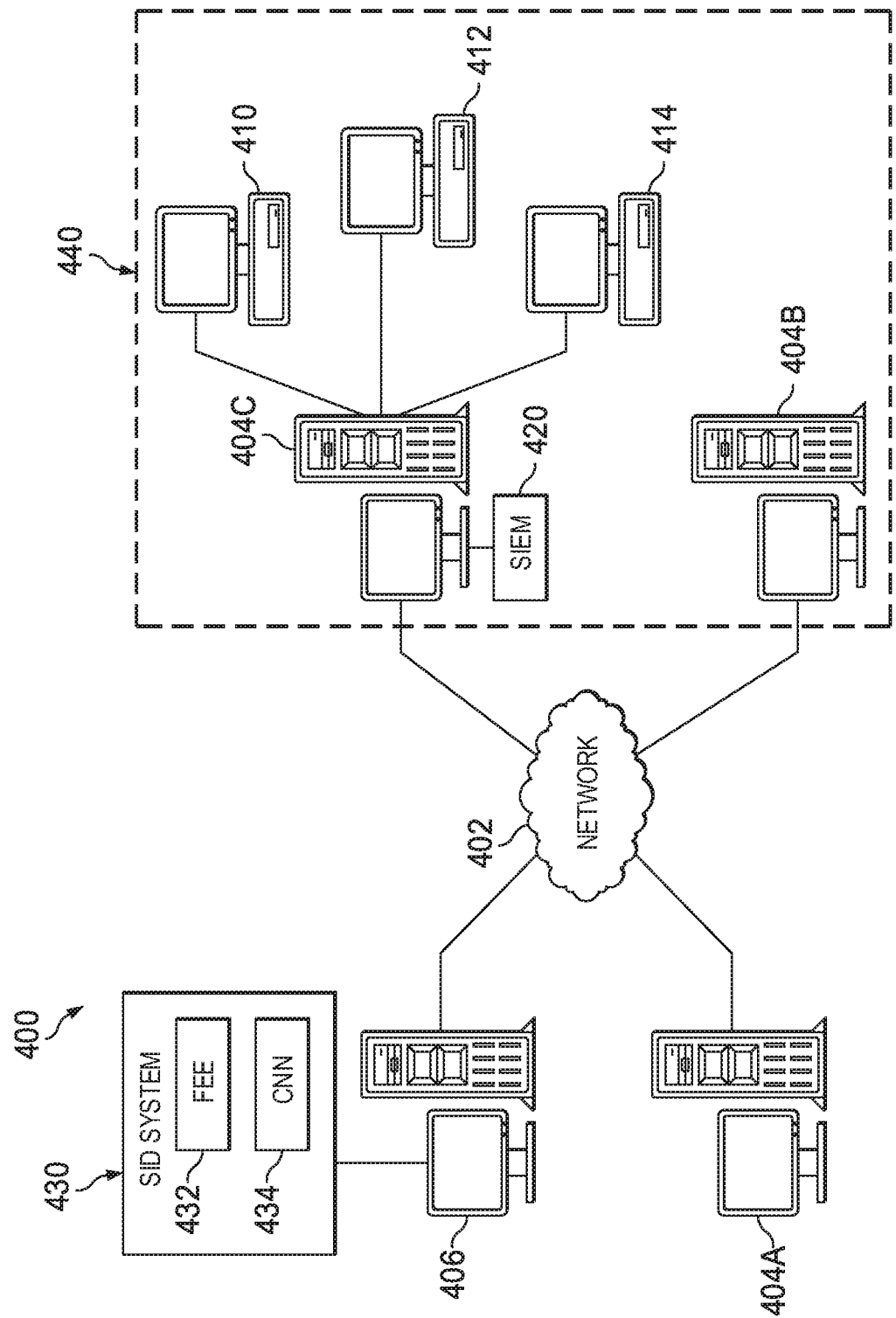
FIG. 4 depicts a pictorial representation of an example distributed data processing system in which aspects of the illustrative embodiments may be implemented.
Figure 5:
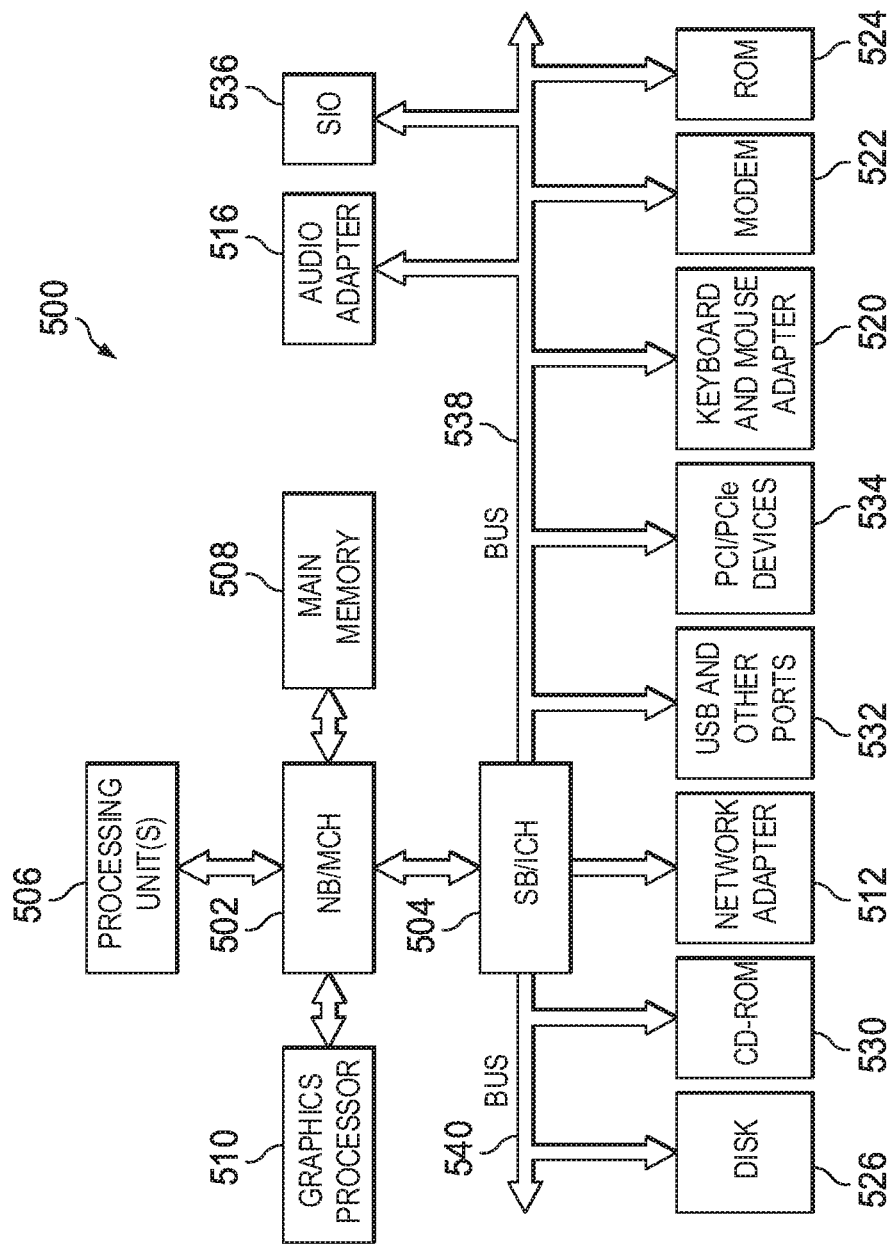
FIG. 5 is a block diagram of one example data processing system in which aspects of the illustrative embodiments may be implemented.

It is apparent from the above description that the illustrative embodiments may be utilized in many different types of data processing environments. In order to provide a context for the description of the specific elements and functionality of the illustrative embodiments, FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, servers 404A-C and server 406 are connected to network 402 along with storage units 408. In addition, clients 410, 412, and 414 are also connected to network 402. These clients 410, 412, and 414 may be, for example, personal computers, network computers, or the like. In the depicted example, server 404 provides data accessible by the clients 410, 412, and 414 in order to render content on the clients 410-614 via one or more applications, an operating system, and the like, executing on the clients 410-414. Distributed data processing system 400 may include additional servers, clients, and other devices not shown, e.g., network routing or switching equipment, storage devices, and the like.

In the depicted example, distributed data processing system 400 is the Internet with network 402 representing a worldwide collection of networks and gateways that use the Transmission Control Protocol/Internet Protocol (TCP/IP) suite of protocols to communicate with one another, and potentially a plurality of other protocols including User Datagram Protocol for DNS, UDP for communication, etc. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., one or more of the servers 404A-404C, may be specifically configured to implement a SIEM system 420 in combination with one or more computing resources of a monitored computing environment 440, which may include one or more of the client computing devices 410-414, network appliances, storage devices, and the like, which may execute applications and the like, all of which may be considered computing resources, either physical or virtual in nature. In addition, one or more servers may be configured to implement an SID computing system 430 in accordance with one or more of the illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 404A-404C and/or 406, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, the implementation of the mechanisms of the illustrative embodiments improves the functionality of the computing device and provides a useful and concrete result that facilitates generating security incident/alert disposition predictions as to whether or not the security incident/alert represents a true threat or a false positive.

As shown in FIG. 4, one or more of the client devices 410414 may be associated with the monitored computing environment 440 and may represent computing resources of the monitored computing environment 440. One or more computing devices of the monitored computing environment 440, e.g., one of the client devices 410-414, a server (not shown), or the like, may execute a security monitoring engine which applies SIEM rules to security events occurring with regard to the computing resources of the monitored computing environment to determine if the security events potentially represent attacks/threats and if so, generates a security alert for further investigation by a security analyst.

With the mechanisms of the illustrative embodiments, the security incidents/alerts generated by the SIEM system based on the application of the SIEM rules are further analyzed by the SID computing system 430, comprising the feature extraction engine (FEE) 432 and the trained cognitive computing predictive model 434, to determine whether the security alert represents a true threat and should be escalated or is instead likely a false positive and does not need to be escalated. Alternatively, in other illustrative embodiments, the trained cognitive computing predictive model may determine various other dispositions of the security incident/alert, such as classifying the security incident/alert into a disposition category corresponding to a responsive action to be performed either automatically or semi-automatically. As described previously, the FEE 432 extracts features from the security incident/alert itself, the security knowledge graph for the security incident/alert as generated by the SIEM 420, and may generate additional metric features based on the extracted features. The resulting feature set is then input to the trained cognitive computing predictive model 434 for evaluation and classification as to the appropriate disposition for the security incident/alert.

The disposition classification output generated by the predictive model 434 may be returned to a security analyst associated with the SIEM system 420 of the monitored environment 440 for presentation to the security analyst so that they are made aware of which security incidents/alerts warrant additional investigation and expenditure of resources to address potential security threats, i.e. which are to be escalated and which are not. Alternatively, the disposition classification output may be used to automatically or semi-automatically initiate responsive actions by the SIEM 420 to perform computer actions to protect computer resources that are at risk from the security event, e.g., block access to targeted computing resources or the like. The prediction of the disposition classification may be output to the security analyst via a threat monitoring interface of the SIEM system 420, for example, and user feedback may be received in the event that the security analyst believes that the recommended disposition of the security incident/alert is incorrect.

As noted above, the mechanisms of the illustrative embodiments utilize specifically configured computing devices, or data processing systems, to perform the operations of the SID computing system. These computing devices, or data processing systems, may comprise various hardware elements which are specifically configured, either through hardware configuration, software configuration, or a combination of hardware and software configuration, to implement one or more of the systems/subsystems described herein. FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/MCH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PC/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System p® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for execution by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the SIEM rules management system.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters. Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a security incident disposition system, wherein the security incident disposition system operates to:
   receive, from a source computing device of a monitored computing environment, a security incident comprising a security incident data structure comprising metadata describing properties of the security incident, and a corresponding security knowledge graph, wherein the security knowledge graph comprises nodes representing elements associated with the security incident, and edges representing relationships between the nodes;
   process the security incident data structure and security knowledge graph to extract, from the metadata of the security incident data structure and data corresponding to the nodes and edges of the security knowledge graph, a set of security incident features corresponding to the security incident;
   input the extracted set of security incident features into a trained security incident machine learning model of the security incident disposition system;
   generate, by the trained security incident machine learning model of the security incident disposition system, a disposition classification output based on results of processing the extracted set of security incident features by the trained security incident machine learning model; and
   output the disposition classification output to the source computing device.

2. The method of claim 1, wherein the security incident disposition system further operates to:
   process the security knowledge graph to extract topology features representing an overall topology of the security knowledge graph; and
   input the extracted topology features into the trained security incident machine learning model, wherein the trained security incident machine learning model generates the disposition classification based on results of processing the extracted set of security incident features and the extracted topology features.

3. The method of claim 1, wherein processing the security incident data structure and securing knowledge graph to extract security incident features further comprises:
   calculating one or more metrics based on the extracted set of security incident features; and
   adding the one or more metrics as additional security incident features to the set of security incident features prior to inputting the extracted set of security incident features into the trained security incident machine learning model.

4. The method of claim 1, wherein the disposition classification is a prediction of a responsive action to perform in response to the security incident.

5. The method of claim 4, wherein the disposition classification is one of a predetermined set of potential disposition classifications, each disposition classification corresponding to a different responsive action in a set of responsive actions, and wherein the set of responsive actions comprises at least one of a block responsive action that blocks access by a source of the security incident to computing resources or a redirect responsive action that redirects access by a source of the security incident to alternative computing resources.

6. The method of claim 4, wherein the disposition classification is one of an escalate disposition classification that causes a notification of a potential threat associated with the security incident to a system administrator, or a do not escalate disposition classification which does not result in the notification.

7. The method of claim 1, wherein the trained security incident machine learning model is a neural network trained on a set of training data comprising security incidents, corresponding security knowledge graphs for the security incidents in the set of training data, and corresponding correct disposition classifications for the security incidents, and wherein the trained security incident machine learning model is trained based on training features extracted from the training data and corresponding security knowledge graphs of the set of training data using a machine learning process.

8. The method of claim 1, wherein outputting the disposition classification output to the source computing device further comprises outputting a graphical user interface comprising a graphical representation of the security knowledge graph corresponding to the security incident with graphical features designating different types of elements of the security knowledge graph, and the disposition classification as a recommended disposition for the security incident.

9. The method of claim 8, wherein outputting the graphical user interface further comprises outputting a feedback user interface for receiving user input specifying a correctness or incorrectness of the recommended disposition, and wherein the feedback user interface further comprises one or more use interface elements for specifying a correct disposition for the security incident.

10. The method of claim 9, wherein the security incident disposition system further operates to:
receive user input, via the feedback user interface, specifying the recommended disposition to be incorrect and providing a correct disposition for the security incident;
generate a dynamic training data set based on the received user input; and
retrain the trained security incident disposition system based on the dynamic training data set.

11. A computer program product comprising a computer readable storage medium having a computer readable program stored therein, wherein the computer readable program, when executed on a computing device, causes the computing device to implement a security incident disposition system which operates to:
receive, from a source computing device of a monitored computing environment, a security incident comprising a security incident data structure comprising metadata describing properties of the security incident, and a corresponding security knowledge graph, wherein the security knowledge graph comprises nodes representing elements associated with the security incident, and edges representing relationships between the nodes;
process the security incident data structure and security knowledge graph to extract, from the metadata of the security incident data structure and data corresponding to the nodes and edges of the security knowledge graph, a set of security incident features corresponding to the security incident;
input the extracted set of security incident features into a trained security incident machine learning model of the security incident disposition system;
generate, by the trained security incident machine learning model of the security incident disposition system, a disposition classification output based on results of processing the extracted set of security incident features by the trained security incident machine learning model; and
output the disposition classification output to the source computing device.

12. The computer program product of claim 11, wherein the security incident disposition system further operates to:
process the security knowledge graph to extract topology features representing an overall topology of the security knowledge graph; and
input the extracted topology features into the trained security incident machine learning model, wherein the trained security incident machine learning model generates the disposition classification based on results of processing the extracted set of security incident features and the extracted topology features.

13. The computer program product of claim 11, wherein processing the security incident data structure and securing knowledge graph to extract security incident features further comprises:
calculating one or more metrics based on the extracted set of security incident features; and
adding the one or more metrics as additional security incident features to the set of security incident features prior to inputting the extracted set of security incident features into the trained security incident machine learning model.

14. The computer program product of claim 11, wherein the disposition classification is a prediction of a responsive action to perform in response to the security incident.

15. The computer program product of claim 14, wherein the disposition classification is one of a predetermined set of potential disposition classifications, each disposition classification corresponding to a different responsive action in a set of responsive actions, and wherein the set of responsive actions comprises at least one of a block responsive action that blocks access by a source of the security incident to computing resources or a redirect responsive action that redirects access by a source of the security incident to alternative computing resources.

16. The computer program product of claim 14, wherein the disposition classification is one of an escalate disposition classification that causes a notification of a potential threat associated with the security incident to a system administrator, or a do not escalate disposition classification which does not result in the notification.

17. The computer program product of claim 11, wherein the trained security incident machine learning model is a neural network trained on a set of training data comprising security incidents, corresponding security knowledge graphs for the security incidents in the set of training data, and corresponding correct disposition classifications for the security incidents, and wherein the trained security incident machine learning model is trained based on training features extracted from the training data and corresponding security knowledge graphs of the set of training data using a machine learning process.

18. The computer program product of claim 11, wherein outputting the disposition classification output to the source computing device further comprises outputting a graphical user interface comprising a graphical representation of the security knowledge graph corresponding to the security incident with graphical features designating different types of elements of the security knowledge graph, and the disposition classification as a recommended disposition for the security incident.

19. The computer program product of claim 18, wherein outputting the graphical user interface further comprises outputting a feedback user interface for receiving user input specifying a correctness or incorrectness of the recommended disposition, and wherein the feedback user interface further comprises one or more use interface elements for specifying a correct disposition for the security incident.

20. An apparatus comprising:
a processor; and
a memory coupled to the processor, wherein the memory comprises instructions which, when executed by the processor, cause the processor to implement a security incident disposition system which operates to:
receive, from a source computing device of a monitored computing environment, a security incident comprising a security incident data structure comprising metadata describing properties of the security incident, and a corresponding security knowledge graph, wherein the security knowledge graph comprises nodes representing elements associated with the security incident, and edges representing relationships between the nodes;
process the security incident data structure and security knowledge graph to extract, from the metadata of the security incident data structure and data corresponding to the nodes and edges of the security knowledge graph, a set of security incident features corresponding to the security incident;
input the extracted set of security incident features into a trained security incident machine learning model of the security incident disposition system;
generate, by the trained security incident machine learning model of the security incident disposition system, a disposition classification output based on results of processing the extracted set of security incident features by the trained security incident machine learning model; and
output the disposition classification output to the source computing device.

* * * * *